June 11, 1963
W. C. THOMPSON, JR
3,092,991
METER CALIBRATION
Filed Feb. 10, 1961
2 Sheets-Sheet 1
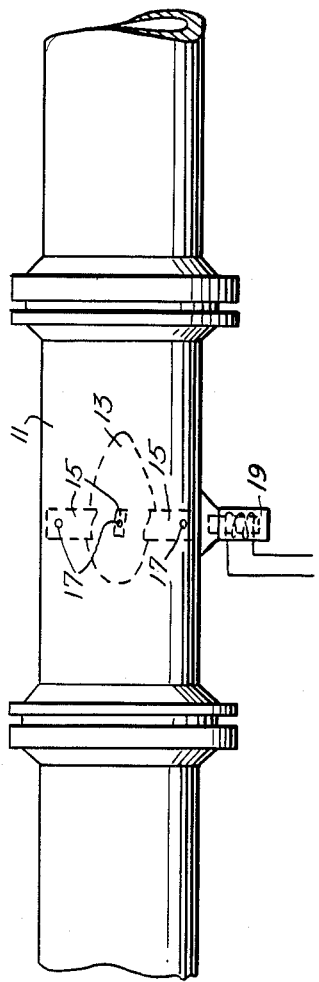
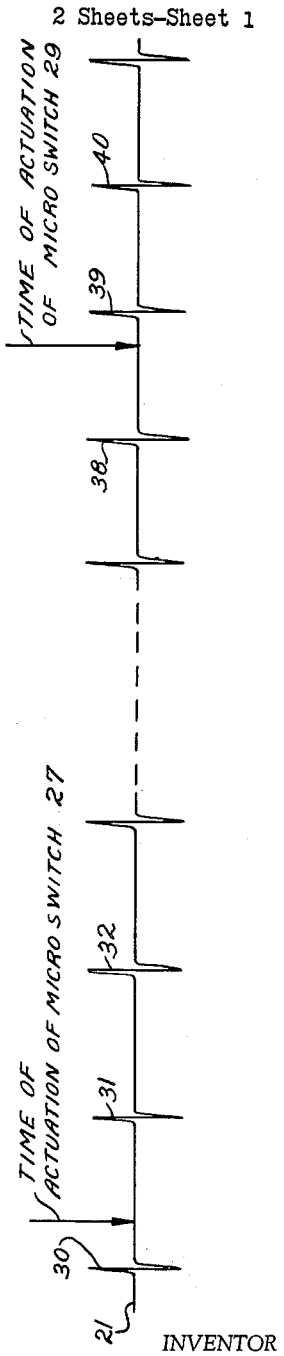
INVENTOR
WILLIAM CRAWFORD THOMPSON, JR.
BY
Stevens, Davis, Miller & Mosher
ATTORNEYS

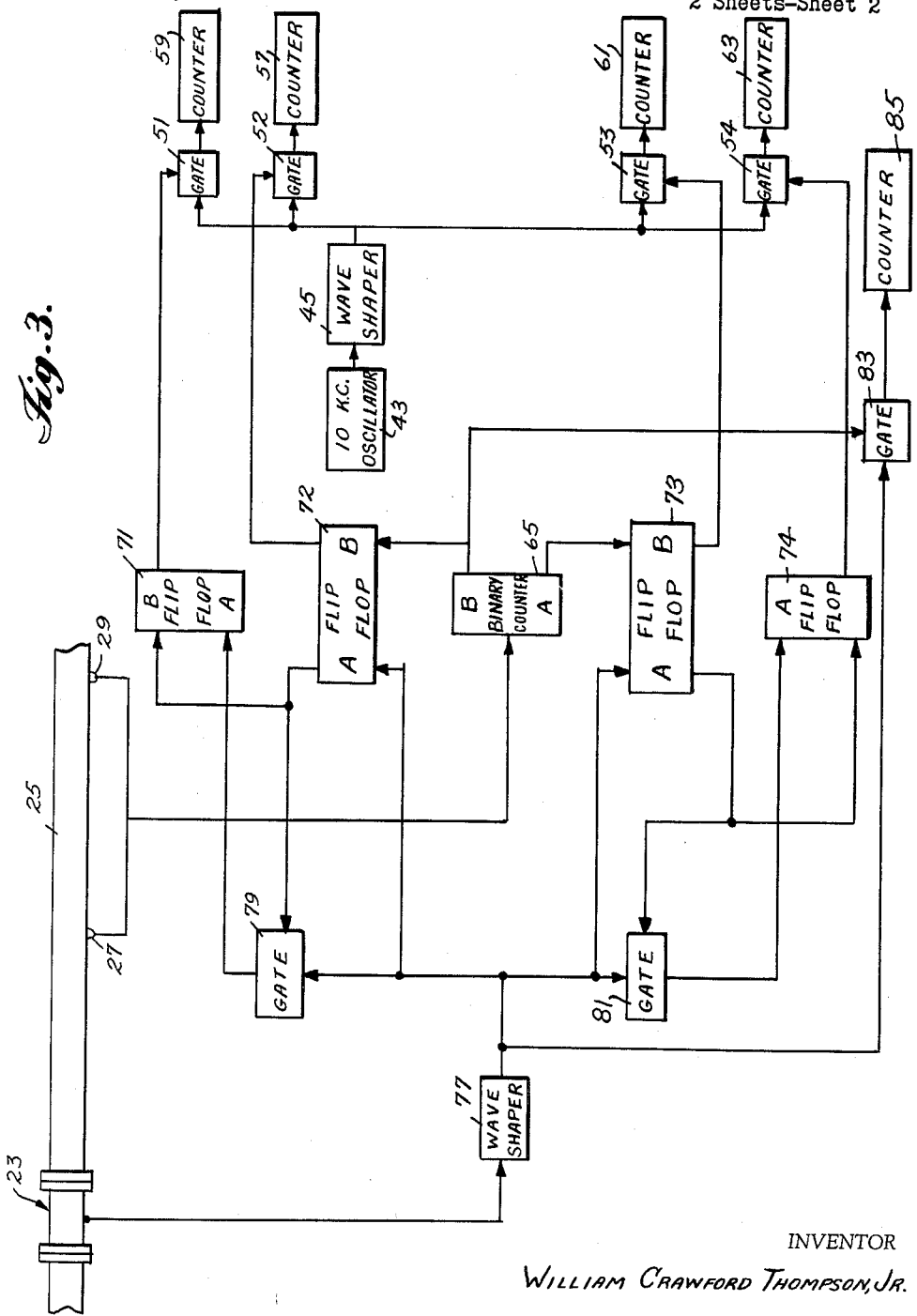

United States Patent Office 3,092,991
Patented June 11, 1963

3,092,991
METER CALIBRATION
William Crawford Thompson, Jr., Decatur, Ga., assignor to Plantation Pipe Line Company, a corporation of Delaware
Filed Feb. 10, 1961, Ser. No. 88,520
8 Claims. (Cl. 73—3)

This invention relates to a system for measuring precise time relationships and more particularly to a system for increasing the precision in the calibration of meters by measuring these time relationships.

When fluids such as fuels and oils are transported by pipeline it is essential to have an accurate meter indication of the amount of fuel flow. This accuracy is particularly important to the pipeline company, as an error as small as 0.01% can cost a pipeline company as much as fifty thousand dollars a year. The indications directly provided by meters in the pipelines are not this accurate, but the error in the indications provided by the meters are precisely consistent so the meters can be calibrated to provide the necessary accuracy.

One method of calibrating a meter measuring the amount of fluid flow is to connect the pipeline to flow into a prover tank having an accurately known volume. The meter can then measure the amount of fluid necessary to fill the prover tank and the meter can be accurately calibrated by comparing the indication of the meter with the known volume of the prover tank. This system, however, is not desirable for calibrating the meters of large pipelines having an immense volume of fluid flow per unit time because even a large prover tank would be filled much too quickly to provide an accurate calibration of the meter.

The meters of some large pipelines are calibrated by using a section of pipeline which has a volume that is known to an accuracy of plus or minus 0.02%. The flow through this section of pipeline is measured by the meter to be calibrated. A free piston is pushed through this section of pipeline and actuates a microswitch when it starts through the section and another microswitch when it gets to the end of the section. By observing the meter indication of the amount of flow during the interval between the times when the two microswitches are actuated and comparing this indication with the accurately known volume of the pipeline section, a calibration of the fluid meter can be obtained. However, this system of calibration is not sufficiently precise to provide the needed accuracy in conveniently short sections of pipeline because of the characteristics of the meters used to measure the amount of flow through pipelines. One such meter is called a turbine meter and comprises a rotor which is positioned in the pipeline and which rotates at a rate determined by the rate of fluid flow. Thus the total amount of rotation of this rotor is an indication of the volume of fluid flow. The rotor has magnet-tipped blades spaced radially around its periphery and these magnets induce a pulse in a magnetic pickup as they rotate past this pickup. Each meter pulse indicates that the rotor has rotated through one blade angle, which is defined as the angular spacing between adjacent blades on the meter rotor. A count of the output pulses from this pickup will provide an indication of the amount of rotation of the meter rotor in units of blade angles, and in this manner an indication of the volume of flow is obtained. When the meter is being calibrated using the pipeline section with the accurately known volume, the meter pulses that are produced between the actuation of the first microswitch and the actuation of the second microswitch are counted to provide the meter indication of the volume of flow during the interval between the times when the microswitches are actuated. This indication is then compared with the volume of the pipeline section to calibrate the meter. This system of calibrating turbine meters is not sufficiently precise because although this system indicates exactly how many meter pulses are produced between actuations of the microswitches, it does not indicate precisely the amount of rotation of the meter rotor that occurs between actuations of the microswitches because the amount of rotation of the meter rotor that occurs between the actuation of the first microswitch and the next occurring meter pulse is unknown and the amount of rotation that occurs after the last meter pulse before the actuation of the second microswitch is unknown. Because of this lack of precision the count of the meter pulses in the test interval between actuations of the first and second microswitches indicates the meter rotor rotation during the test interval to an accuracy of only plus or minus one blade angle. The lack of precision results because the actuation of each of the microswitches does not occur in any set time relationship with the meter output pulses. For example, the actuation of the first microswitch could occur immediately after a meter pulse and the actuation of the second microswitch could occur immediately before a meter pulse, or vice versa. The amount of rotation of the meter rotor during the test interval between actuations of the microswitches can vary up to two blade angles with the meter producing the same number of output pulses during the test interval.

Accordingly, one object of the present invention is to increase the precision of the calibraion of turbine meters.

Another object of this invention is to provide an improved system for calibrating turbine meters.

A further object of this invention is to make possible a more precise measuremnet of fluid flow in pipelines.

The present invention improves upon the calibration system using the pipeline section having the accurately known volume by providing an accurate measure of the time interval between the actuation of the first microswitch and the next meter pulse occurring after the actuation of the first microswitch and an accurate measure of the time interval between the first two meter pulses to occur after the actuation of the first microswitch. The first measured time interval divided by the second measured time interval provides a very precise measurement of the amount of rotation of the meter rotor in the interval between the actuation of the first microswitch and the first meter pulse occurring after the actuation of the first microswitch. The rotation of the meter rotor during this interval computed by this method is in units of blade angles. The interval between actuation of the second microswitch and the next meter pulse occurring after the actuation of the second microswitch and the interval between the first two meter pulses occurring after actuation of the second microswitch are also measured. If the interval between the actuation of the second microswtich and the next meter pulse occurring thereafter is divided by the interval between the first two meter pulses occurring after the actuation of the second microswitch and the resulting quotient is subtracted from 1, there will be provided an accurate measurement of the meter rotation during the interval that precedes the actuation of the second microswitch after the last occurring meter pulse before the actuation of this microswitch. The rotation of the meter rotor during this interval as detremined by this method will be in units of blade angles. These methods of determining the rotor rotation during these two intervals make the assumption that the rate of flow and therefore the rate of rotation of the meter rotor does not change substantially between meter pulses. In practice this is an accurate assumption as the rate of flow will not rapidly change in the short time between two meter pulses, especially during a calibration test. If the rotations of the meter rotor determined by these two methods are added to the total number of meter pulses that occur between actuations of the microswitches minus 1, then the total rotation of the meter rotor will be precisely determined in units of blade angles and the meter can be accurately calibrated against the known volume of the pipeline section.

The system of the present invention measures the time intervals which are required to be known by generating pulses at a constant high frequency and counting the high frequency pulses that occur in these intervals. The ratios of these counts will then provide the desired quotients to be used in determining the precise rotation of the meter rotor.

The principles of the present invention can also be applied to applications other than meter calibration involving precise measurement of time intervals. The principles of the present invention can be used to measure the time relationship between a first event and a series of second events which do not occur at a fixed frequency but in which the time interval between successive events does not vary substantially.

Accordingly a further object of the present invention is to provide more precise measurements of time relationships.

A still further object of this invention is to provide an improved system for measuring time relationships.

Further objects and advantages of the present invention will become readily apparent as the following detailed description of a specific embodiment of the invention unfolds and when taken in conjunction with the drawings, wherein:

FIG. 1 schematically illustrates a turbine meter of the type calibrated by the system of the present invention;

FIG. 2 illustrates the waveform of the pulse output of the turbine meter and shows how the count of the turbne meter output pulses alone in the test interval between actuations of the microswitches fails to provide a precise indication of the amount of meter rotor rotation during this test interval; and FIG. 3 is a block diagram of the calibration system of the present invention.

As shown in FIG. 1, the turbine meter which is to be calibrated by the system of the present invention comprises a section of pipe 11 in which there is mounted a rotor 13. The section of pipe 11 is connected so that the fluid to be metered flows therethrough around the rotor 13. The rotor 13 has radially spaced blades 15, in the tip of each of which is a magnet 17. As the fluid flows through the pipe section 11 past the rotor 13 it causes the rotor 13 to rotate at a rate dependent upon the rate of fluid flow so that the total rotation of the rotor 13 provides an indication of the volume of fluid flow. An inductive pickup 19 is mounted on the outside of the pipe section 11 adjacent to the rotor 13 so that as the rotor 13 rotates, the magnets 17 in the blades 15 pass in inductive relationship with the inductive pickup 19. As each blade 15 passes by the inductive pickup 19, the magnet 17 in the tip of this blade 15 induces a pulse in the inductive pickup 19, so that the inductive pickup 19 produces an output pulse as each blade 15 rotates past the inductive pickup 19. Thus a count of the pulse output from the pickup 19 will provide an indication of the rotation of the rotor 13 in units of blade angles and therefore an indication of the volume of flow through the pipe section 11.

The series of output pulses produced by the inductive pickup 19 as a result of the rotation of the rotor 13 produces the waveform 21 illustrated in FIG. 2. Each output pulse generated by the passing of one magnet 17 in the tip of a blade 15 past the inductive pickup 19 comprises a positive spike immediately followed by a negative spike.

When the turbine meter is calibrated, the section of pipe 11 is connected in series with a section of pipeline having an accurately known volume. This connection is illustrated schematically in FIG. 3 in which the turbine meter is designated generally by the reference number 23 and the section of pipeline having the accurately known volume is designated by the reference number 25. When fluid flows through the turbine meter 23 and through the section of pipeline 25, it pushes a free piston through the section of pipeline 25. When the free piston starts through the section 25, it actuates a microswitch 27 and when the free piston gets to the end of the section 25 it actuates a second microswitch 29. The amount of flow through the meter 23 between actuations of the microswitches 27 and 29 will be precisely the volume in the section of pipeline 25. Therefore by comparing the total rotation of the rotor of the meter 23 during the test interval between the actuations of the microswitches 27 and 29 with the volume of the section of pipeline 25, the meter 23 can be accurately calibrated.

The rotation of the rotor of the meter 23 is normally determined by counting the output pulses from the meter 23. However, the count of these pulses occurring between the actuations of the microswitches 27 and 29 will not provide a precise enough indication of the rotation of the rotor of the meter 23, as will be evident from FIG. 2. As shown in FIG. 2, the first microswitch 27 is actuated between meter pulses 30 and 31. After the actuation of the first microswitch there follow a number of pulses before the actuation of the second microswitch 29. The last meter pulse produced before the actuation of the microswitch 29 is designated by the reference number 38 and the first two meter pulses to be produced after the actuation of the microswitch 29 are designated 39 and 40 in their order of occurrence. The same number of meter pulses would be generated during the test interval between actuations of the microswitches 27 and 29, no matter when between meter pulses 30 and 31 the microswitch 27 is actuated, and no matter when between the pulses 38 and 39 the microswitch 29 is actuated. Thus the actual rotation of the rotor of the meter 23 can vary up to two blade angles in the test interval between actuations of the microswitches 27 and 29 and the meter 23 would still generate the same number of pulses during the test interval. The system of the present invention remedies this lack of precision by providing a measurement of the amount of rotation of the meter rotor during the interval between the actuation of the microswitch 27 and the meter pulse 31, which is the first occurring pulse after the actuation of the microswitch 27, and by measuring the amount of rotation of the meter rotor during the interval between the meter pulse 38 and the actuation of the microswitch 29, the meter pulse 38 being the last occurring meter pulse before the actuation of the microswitch 29.

The system of the invention carries out these measurements of rotation of the meter rotor by generating a high constant frequency pulse train. The number of high constant frequency pulses that occur between the actuation of the microswitch 27 and the meter pulse 31 are counted and the number of pulses that occur between the meter pulse 31 and the meter pulse 32, which is the second occurring meter pulse after the actuation of the microswitch 27, are also counted. This latter count of pulses between meter pulses 31 and 32 is divided into the former count of pulses between the actuation of the microswitch 27 and the meter pulse 31, and the resulting quotient will be a precise representation of the amount of meter rotor rotation between the actuation of the microswitch 27 and the meter pulse 31. This method of determining the meter rotor rotation makes the accurate assumption that the rate of fluid flow and therefore the speed of rotation of the meter rotor does not change substantially between meter pulses. Because of this fact the time between meter pulses 31 and 32 will be substantially the same as the time between meter pulses 30 and 31, so therefore the count of the constant high frequency pulses occurring between meter pulses 31 and 32 will be substantially the same as the number of constant high frequency pulses occurring between meter pulses 30 and 31. Thus the quotient obtained by dividing the number of pulses occurring between the actuation of the microswitch 27 and the meter pulse 31 by the number of high frequency pulses that occur between the meter pulses 31 and 32 will equal the quotient that would have been obtained had the number of high frequency pulses between meter pulses 30 and 31 been the divisor. Accordingly the quotient obtained by this system is an accurate indication of the meter rotor rotation during the interval between the actuation of the microswitch 27 and the meter pulse 31 in units of blade angles.

The system of the invention measures the rotation of the meter rotor that occurs between meter pulse 38 and the actuation of the microswitch 29 in a similar manner. The constant high frequency pulses occurring in the interval between the actuation of the microswitch 29 and the meter pulse 39 are counted and this count is divided by the number of high frequency pulses occurring in the interval between the meter pulses 39 and 40, which are the next two succeeding meter pulses occurring after the actuation of the microswitch 29. The number of constant high frequency pulses occurring between the meter pulses 39 and 40 will substantially equal the number of constant high frequency pulses occurring between meter pulses 38 and 39, so when this quotient is subtracted from 1, the resulting difference will be an accurate indication of the meter rotor rotation during the interval between the meter pulse 38 and the actuation of the microswitch 29 in units of blade angles. If the amount of meter rotor rotation thus determined to have occurred during the interval between the actuation of the microswitch 27 and the meter pulse 31 and in the interval between the meter pulse 38 and the actuation of the microswitch 29 is added to the number of meter pulses minus 1 generated in the test interval between actuations of the microswitches 27 and 29, the result of this computation will be an accurate indication of the total rotation of the meter rotor during the test interval. This indication can then be compared with the volume of the pipeline section 25 to precisely calibrate the meter 23.

As shown in FIG. 3, a system for carrying out the measurements of the meter rotor rotations during the critical intervals comprises a ten kilocycle per second oscillator 43, the output of which is fed to a wave shaper 45, which produces output pulses at a constant frequency of ten kilocycles per second. The high constant frequency pulses from the wave shaper 45 are fed to four normally disabled gates 51 through 54. The gate 52 will be automatically enabled during the interval between the actuation of the microswitch 27 and the meter pulse 31 and the constant high frequency pulses will be fed during this interval from the wave shaper 45 through the gate 52 to a counter 57, which counts the pulses during this interval. The gate 51 will be automatically enabled during the interval between meter pulses 31 and 32 and the constant high frequency pulses will be fed during this interval from the wave shaper 45 through the gate 51 to a counter 59 and be counted thereby. The gate 53 will be automatically enabled during the interval between the actuation of the microswitch 29 and the meter pulse 39 and the high constant frequency pulses will be fed during this interval from the wave shaper 45 through the gate 53 to a counter 61, which counts the pulses during this interval. The gate 54 will be enabled during the interval between meter pulses 39 and 40 and the high constant frequency pulses will pass from the wave shaper 45 through the gate 54 during this interval and be counted by a counter 63. The count registered by the counter 57 divided by the count registered by the counter 59 after the completion of the operation will indicate in units of blade angles the rotation of the meter rotor during the interval between the actuation of the microswitch 27 and the meter pulse 31. The count registered by the counter 61 divided by the count registered by the counter 63 subtracted from 1 will indicate the meter rotor rotation in units of blade angles during the interval between the meter pulse 38 and the actuation of the microswitch 29.

To carry out the automatic enabling of the gates 51–54 during the critical intervals, four flip-flops 71 through 74 and a binary counter 65 are used. Each of the flip-flops 71 through 74 has two stable states designated the A state and the B state. Each of the flip-flops 71 through 74 has two inputs, which shall be designated as the A input and the B input. Whenever a pulse is applied to the A input of one of the flip-flops 71 through 74 it will cause such flip-flop to switch to its A state and whenever a pulse is applied to the B input of one of the flip-flops 71 through 74 it will cause such flip-flop to switch to its B state. If any one of the flip-flops 71 through 74 is already in its A state when a pulse is applied to its A input or already in its B state when a pulse is applied to its B input, then such flip-flop will remain in the state that it is in. The binary counter 65 is also a flip-flop having two stable states, which shall be designated as the A state and the B state. But the binary counter 65 has only a single input. When a pulse is applied to the single input of the binary counter 65 it will cause it to switch to its opposite state.

The flip-flops 71 through 74 and the binary counter 65 are all normally in their A states. While in their A states the flip-flops 72 and 73 apply enabling signals to gates 79 and 81 respectively. The meter pulses generated by the meter 23 are applied to a wave shaper 77 which clips off the negative spike of each of the meter pulses. The meter pulses preceding the actuation of the microswitch 27, including the meter pulse 30, after being shaped by the wave shaper 77, are applied directly to the A inputs of the flip-flops 72 and 73 and through the enabled gates 79 and 81 to the A inputs of the flip-flops 71 and 74. Since these flip-flops all are already in their A states the meter pulses preceding the actuation of the microswitch 27 have no effect on the system. When the free piston starts through the pipeline section 25 and actuates the microswitch 27, the microswitch 27 applies a pulse to the binary counter 65 causing the binary counter to switch to its B state. When the binary counter 65 switches to its B state it applies a pulse to the B input of flip-flop 72 causing the flip-flop 72 to switch to its B state. When the flip-flop 72 is in its B state it applies an enabling signal to the gate 52 allowing tht constant high frequency pulses from the wave shaper 45 to pass to and be counted by the counter 57. The first occurring meter pulse 31 after the actuation of the microswitch 27, after being shaped by the wave shaper 77, will cause the flip-flop 72 to be switched back to its A state. The flip-flop 72 will then cease applying an enabling signal to the gate 52. Thus the gate 52 will be enabled just during the interval between the actuation of the microswitch 27 and the meter pulse 31.

When the flip-flop 72 switches back to its A state it applies a pulse to the B input of the flip-flop 71, causing the flip-flop 71 to switch to its B state. When the flip-flop 72 is in its B state it does not apply an enabling signal to the gate 79 so the meter pulse 31, which is applied to the gate 79 before the flip-flop 72 switches back to its A state, cannot pass through to the A input of the flip-flop 71 and interfere with the switching of the flip-flop 71 to its B state when the flip-flop 72 is switched back to its A state. While the flip-flop 71 is in its B state, it applies an enabling signal to the gate 51 and the gate 51 allows the high constant frequency pulses from the wave shaper 45 to pass through to the counter 59 and be counted thereby. When the meter pulse 32 is generated, the flip-flop 72 will be back in its A state and will therefore be applying an enabling signal to the gate 79. The meter pulse 32, after being shaped by the wave shaper 77, will pass through the gate 79 to the A input of the flip-flop 71 and cause the flip-flop 71 to switch back to its A state. The flip-flop 71 will then cease applying an enabling signal to the gate 51, which will thus be enabled only between meter pulses 31 and 32.

All of the meter pulses preceding the actuation of the microswitch 29 will have no effect on the flip-flops 73 and 74, because these flip-flops will both remain in their A states. When the microswitch 29 is actuated, it will apply a pulse to the input of the binary counter 65 and cause the binary counter to switch back to its A state. When the binary counter switches back to its A state, it will apply a pulse to the B input of the flip-flop 73, which in response thereto will switch to its B state. When it is in its B state, the flip-flop 73 applies an enabling signal to the gate 53, which permits the high constant frequency pulses from the wave shaper 45 to pass through to the counter 61 to be counted thereby. The meter pulse 39, which occurs next after the actuation of the microswitch 29, after being shaped by the wave shaper 77, will cause the flip-flop 73 to switch back to its A state. Thus the flip-flop 73 will be in its B state and enable the gate 53 only during the interval between the actuation of the microswitch 29 and the meter pulse 39. When the flip-flop 73 is caused to be switched back to its A state by the meter pulse 39, the flip-flop 73 will apply a pulse to the B input of the flip-flop 74 causing this flip-flop to switch to its B state. When the flip-flop 73 is in its B state it does not apply an enabling signal to the gate 81, so the pulse 39, which is applied to the gate 81 before the flip-flop 73 is switched back to its A state, does not pass through the gate 81 to the A input of the flip-flop 74 and interfere with the switching of this flip-flop to its B state. While the flip-flop 74 is in its B state, it applies an enabling signal to the gate 54, which then allows the high constant frequency pulses from the wave shaper 45 to pass through to the counter 63 and be counted thereby. The pulse 40, which is the second pulse to occur after the actuation of the microswitch 29, will pass through the then enabled gate 81 to the A input of the flip-flop 74 and cause this flip-flop to switch back to its A state. Thus the flip-flop 74 will be in its B state and enable the gate 54 between meter pulses 39 and 40. In this manner the gates 51 through 54 are enabled during the critical intervals and the desired pulse counts are registered in the counters 57, 59, 61 and 63.

While the binary counter 65 is in its B state it applies an enabling signal to a gate 83, which therefore will be enabled in the interval between actuations of the microswitches 27 and 29. While the gate 83 is enabled it will permit the meter pulses from the wave shaper 77 to pass through to a counter 85, which counts the meter pulses. The counter 85 will thus register the number of meter pulses occurring during the test interval between actuations of the microswitches 27 and 29. The formula $$X = (C_{85}-1) + C_{57}/C_{59} + (1 - C_{61}/C_{63})$$
$$= C_{85} + C_{57}/C_{59} - C_{61}/C_{63}$$

will provide the precise rotation of the meter rotor in units of blade angles. In this formula $C_{85}$ is the count registered by the counter 85, $C_{57}$ is the count registered by the counter 57, $C_{59}$ is the count registered by the counter 59, $C_{61}$ is the count registered by the counter 61, and $C_{63}$ is the count registered by the counter 63.

The principles of the present invention, while they are unique and inventive in solving the problem of fluid meter calibration, can be used in other applications in which it is desired to know the time relationship of an event A to a series of events B, the event A occurring between successive events B and the events B not occurring at a constant frequency, but the frequency changing slowly enough that it may be assumed that the duration of any two successive intervals between events B will be substantially the same. In the preferred embodiment of the invention the meter pulses may be considered events B while the actuation of either of the microswitches 27 or 29 may be considered event A.

In the system of the invention as applied to meter calibration, instead of measuring the meter rotor rotation during the critical interval between the start of the test interval, when the microswitch 27 is actuated, and the meter pulse 31, the start of the test interval could be synchronized with the meter pulses. It would then not be necessary to provide a measurement of meter rotor rotation at the start of the test interval but it would still be necessary to measure the meter rotor rotation in the critical interval between the meter pulse 38 and the end of the test interval, when the microswitch 29 is actuated. These and many other modifications may be made to the above described specific embodiment of the invention without departing from the spirit and scope of the invention.

What is claimed is:

1. A system for calibrating a meter of the type for measuring the total amount of fluid flow by producing output pulses at a rate corresponding to the rate of fluid flow comprising means to indicate the start of a test interval and indicate the end of said test interval when a predetermined amount of fluid has passed through the meter to be calibrated after the start of said test interval, means to count the meter pulses produced by said meter to be tested occurring during said test interval, and means to measure the length of the interval between the start of said test interval and the next occurring meter pulse after the start of said test interval, the length of the interval between the first two meter pulses occurring after the start of said test interval, the length of the interval occurring between the end of said test interval and the next occurring meter pulse after the end of said test interval, and the length of the interval between the first two meter pulses occurring after the end of said test interval.

2. A system for calibrating a meter of the type for measuring the total amount of fluid flow by producing output pulses at a rate corresponding to the rate of fluid flow through the meter comprising: means to indicate the start of a test interval and to indicate the end of said test interval when a predetermined amount of fluid has passed through the meter to be calibrated, means to count the meter pulses occurring during said test interval, means to generate pulses at a constant frequency that is high relative to the pulse frequency of the output of the meter to be calibrated, means to count the constant frequency pulses generated during the interval between the start of said test interval and the first occurring meter pulse after the start of said test interval, means to count the number of constant frequency pulses generated during the interval between the first two meter pulses occurring after the start of said test interval, means to count the number of constant frequency pulses generated during the interval between the end of said test interval and the next occurring meter pulse after the end of said test interval, and means to count the number of constant frequency pulses generated during the interval between the first two meter pulses occurring after the end of said test interval.

3. A method of calibrating a meter of the type indicating the total amount of fluid flow by producing output pulses at a rate corresponding to the rate of fluid flow through the meter comprising the steps of: causing fluid to flow through the meter to be calibrated, indicating the start of a test interval, indicating the end of said test interval when a predetermined amount of fluid has flowed through said meter after the start of said test interval, counting the number of meter pulses that occur during said test interval, measuring the length of the interval between the start of said test interval and the next occurring meter pulse after the start of said test interval, measuring the length of the interval between the first two meter pulses occurring after the start of said test interval, measuring the length of the interval between the end of said test interval and the next occurring meter pulse after the end of said test interval, and measuring the length of the interval between the first two meter pulses occurring after the end of said test interval.

4. A method of calibrating a meter of the type indicating the total amount of fluid flow by producing output pulses at a rate corresponding to the rate of fluid flow comprising the steps of: causing fluid to flow through said meter, indicating the start of a test interval, indicating the end of said test interval when a predetermined amount of fluid has flowed through said meter, counting the number of meter pulses to occur during said test interval, generating pulses at a constant frequency that is high relative to the frequency of occurrence of said meter pulses, counting the number of constant frequency pulses that are generated during the interval between the start of said test interval and the next occurring meter pulse after the start of said test interval, counting the number of constant frequency pulses that are generated during the interval between the first two meter pulses to occur after the start of said test interval, counting the number of constant frequency pulses that are generated during the interval between the end of said test interval and the next meter pulse to occur after the end of said test interval, and counting the number of constant frequency pulses that are generated during the interval between the first two meter pulses that occur after the end of said test interval.

5. A system for calibrating a meter of the type for measuring the total amount of fluid flow by producing output pulses at a rate corresponding to the rate of fluid flow comprising: means to indicate the start of a test interval and to indicate the end of said test interval when a predetermined amount of fluid has passed through the meter to be calibrated after the start of said test interval, means to count the meter pulses occurring during said test interval, and means to measure the length of the interval between the end of said test interval and the next occurring meter pulse after the end of said test interval and the length of the interval between the first two meter pulses occurring after the end of said test interval.

6. A system for calibrating a meter of the type for measuring the total amount of fluid flow by producing output pulses at a rate corresponding to the rate of fluid flow through the meter comprising: means to indicate the start of a test interval and to indicate the end of said test interval when a predetermined amount of fluid has passed through the meter to be calibrated after the start of said test interval, means to count the meter pulses occurring during said test interval, means to generate pulses at a constant frequency that is high relative to the pulse frequency output of the meter to be calibrated, means to count the number of constant frequency pulses generated during the interval between the end of said test interval and the next occurring meter pulse after the end of said test interval, and means to count the number of constant frequency pulses generated during the interval between the first two meter pulses occurring after the end of said test interval.

7. A method of calibrating a meter of the type indicating the total amount of fluid flow by producing output pulses at a rate corresponding to the rate of fluid flow through the meter comprising the steps of: causing fluid to flow through the meter to be calibrated, indicating the start of a test interval, indicating the end of said test interval when a predetermined amount of fluid has flowed through said meter after the start of said test interval, counting the number of meter pulses that occurred during said test interval, measuring the length of the interval between the end of said test interval and the next occurring meter pulse after the end of said test interval, and measuring the length of the interval between the first two meter pulses occurring after the end of said test interval.

8. A method of calibrating a meter of the type indicating a total amount of fluid flow by producing output pulses at a rate corresponding to the rate of fluid flow comprising the steps of: causing fluid to flow through said meter, indicating the start of a test interval, indicating the end of said test interval when a predetermined amount of fluid has flowed through said meter after the start of said test interval, counting the number of meter pulses to occur during said test interval, generating pulses at a constant frequency that is high relative to the frequency of occurrence of said meter pulses, counting the number of constant frequency pulses that are generated during the interval between the end of said test interval and the next meter pulse to occur after the end of said test interval, and counting the number of constant frequency pulses that are generated during the interval between the first two meter pulses that occur after the end of said test interval.

References Cited in the file of this patent
UNITED STATES PATENTS

| | | |
|---|---|---|
| 3,021,703 | Pfrehm | Feb. 20, 1962 |
| 3,037,166 | Alexander | May 29, 1962 |